Dec. 24, 1935.  R. MIOLLIS  2,025,213
METHOD AND APPARATUS FOR MAKING CHEESE
Filed May 23, 1934  2 Sheets-Sheet 1
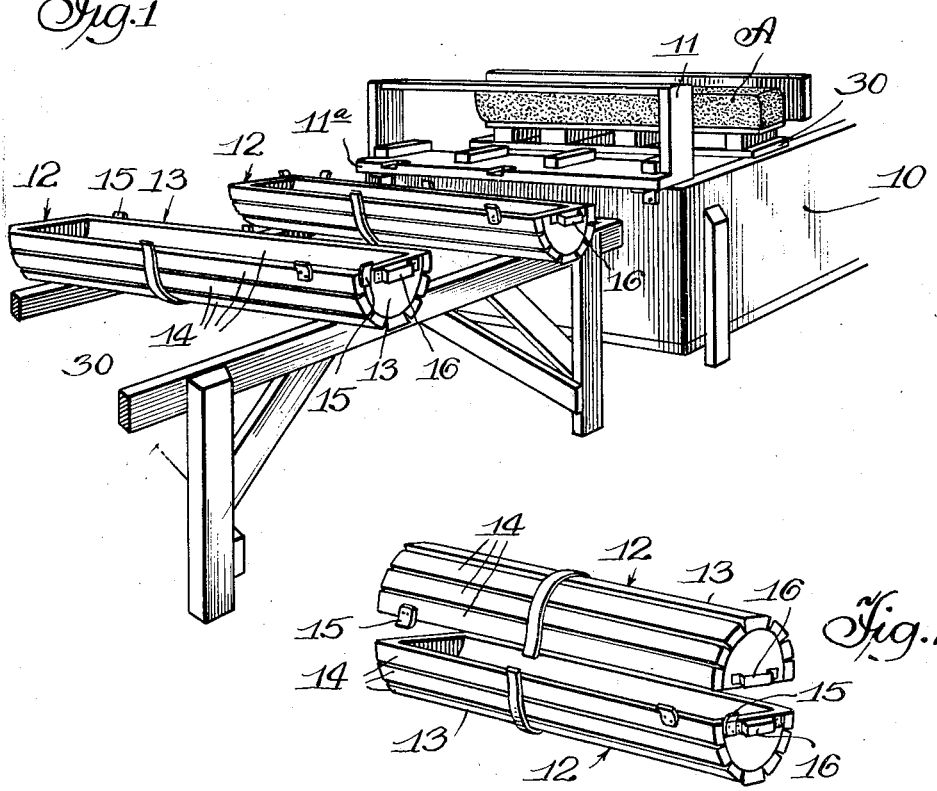
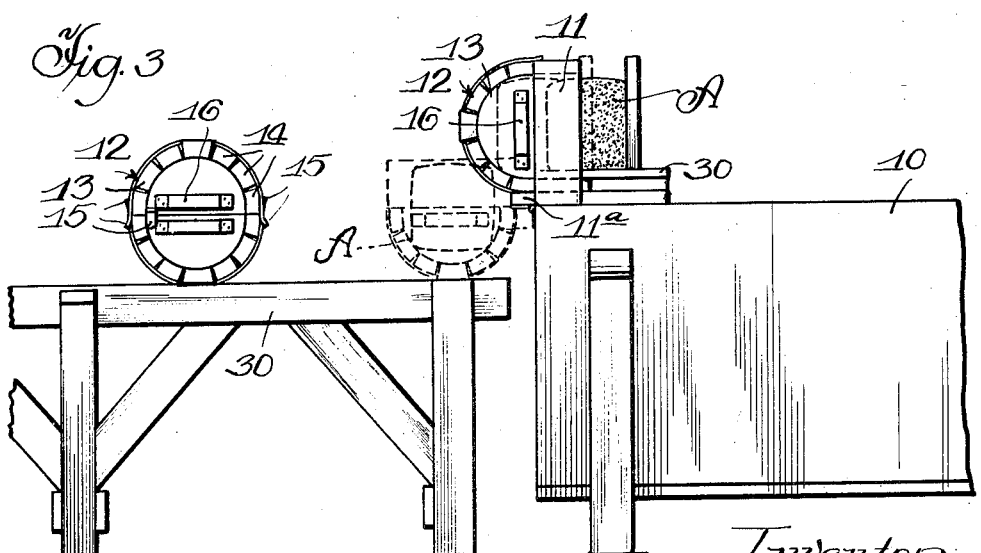
Inventor
Raymond Miollis Dec. 24, 1935.   R. MIOLLIS   2,025,213
METHOD AND APPARATUS FOR MAKING CHEESE
Filed May 23, 1934   2 Sheets-Sheet 2
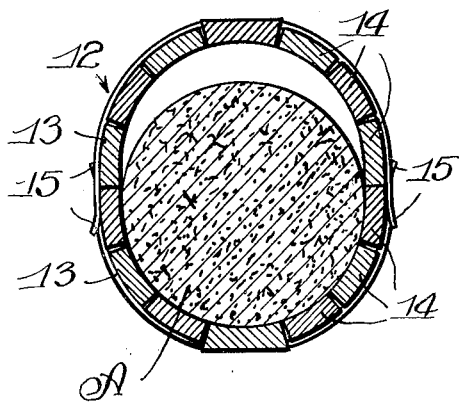
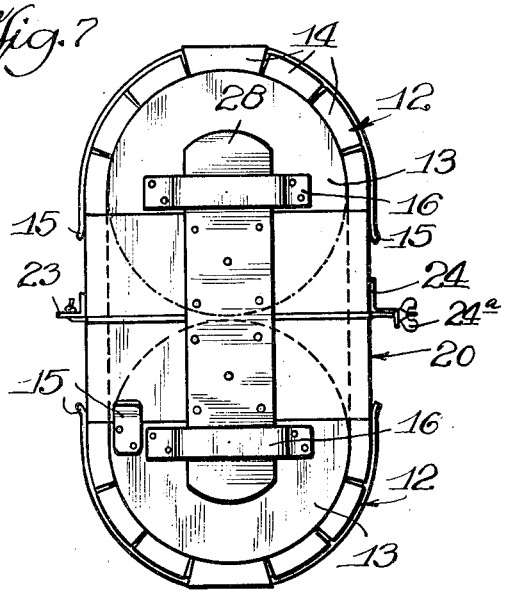
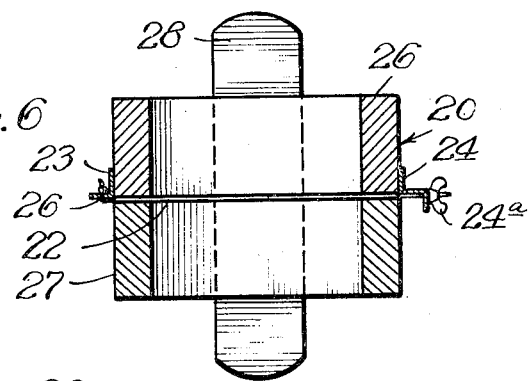
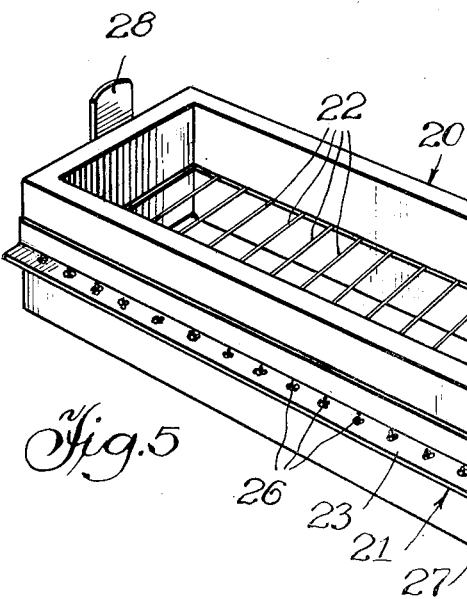

Patented Dec. 24, 1935

2,025,213

UNITED STATES PATENT OFFICE 2,025,213

METHOD AND APPARATUS FOR MAKING CHEESE

Raymond Miollis, Elgin, Ill.

Application May 23, 1934, Serial No. 727,023

8 Claims. (Cl. 31—46)

This invention relates to improvements in methods and apparatus for cheese making, and has for its principal object to provide a new and improved type of apparatus for forming the cheese into package size (bricks or wheels) of substantially uniform weight, and with considerably greater economy due to the saving of much of the manual labor now required with methods heretofore employed.

The present invention relates more particularly to improvements in the older methods and apparatus for making natural cheese in batches, as distinguished from the so-called "process cheese" method of cheese making which has been developed in the last twenty years.

While package cheeses can be produced by the process method at a materially decreased cost, yet its products are generally considered to be less desirable than natural cheeses made by the older hand methods, backed by experience of many generations, with the result that the latter cheeses usually command considerably higher market prices than "process" cheeses. Unfortunately high cost of operation has delayed the development of natural cheese making in America.

The present invention is directed to improvements in the method of making small individual natural cheeses (one pound or less to six pounds or more) from large batches of milk or cream (as much as 10,000 pounds or more).

In general, the older hand process heretofore employed for making natural cheese consists of placing a batch of milk in a large open vat where rennet and lactic acid bacteria curdle the milk which separates later into curds and whey under the action of cheese knives and agitators. Much of the free whey is then drained from the curds while in this vat, until the batch is in the form of a semi-plastic mass matted at the bottom of the cheese vat, which still contains, however, a large amount of whey which must be further drained by subsequent treatment.

The further steps employed in cutting and forming the cheese into individual bricks or wheels may now be described as illustrative of the usual hand methods now in general use.

After the curds are matted at the bottom of the vat the batch of cheese is then cut up into cubic blocks, which are made as nearly as possible of uniform size. These blocks have sufficient coherence to permit the blocks to be removed individually and each is transferred by hand to a wooden or metal bowl, commonly termed a "hoop". These hoops are usually of substantially the same diameter as the size to which the round cheese bricks are finally to be formed, but are considerably deeper than the thickness of the completed brick so as to receive the block of curds which is originally several times the final bulk of the cheese. The hoops are provided with perforations through the bottom and around the sides. When a block of cheese is placed in its hoop, the plastic mass of curds settles down therein and more of the whey drains off by gravity through these perforations, with the result that the block soon fits into the circular form of the bowl, and due to further drainage of the whey therefrom the mass of the curds is substantially reduced. In order to insure uniform drainage of whey from the cheese, each brick is turned upside down into another hoop and again permitted to drain in an inverted position.

After being turned in the hoops one and in some instances more times, each cheese has assumed a circular wheel form, but still contains considerable whey. The cheeses are then removed from the hoops, wrapped in cheesecloth, replaced in the hoops which are placed in a press for a period of several hours so as to remove still more of the whey and compress the cakes in their final form. In order to assure uniformity of texture throughout, the cheeses should also be turned one or more times in the press.

It will be understood, of course, that all of the foregoing operations for forming the cheese, including cutting the batch into blocks, transferring the blocks to the hoops, turning the individual blocks in the hoops, and transferring to the presses, all require numerous individual handlings of the cheese bricks.

Aside from the manual labor involved, one of the difficulties inherent in such a process is that of maintaining uniformity in size and weight of the individual cheese wheels or bricks for commercial or marketing purposes. This is due to the fact that it is difficult to cut the cheese when matted at the bottom of the vat into cubic blocks of exactly the same size, and even if this could be done, the relative content of curd and whey in the several blocks usually varies to some extent in the same batch due to whey pockets, so that the final weights of the completed bricks are different, no matter how much care is taken in their manufacture.

In carrying out my invention, I provide an improved form of apparatus which, although it retains the advantages and characteristics of batch-made natural cheese, yet it eliminates much of the labor required for cutting the batch into individual blocks and turning the cheese in individual hoops as hereinbefore described. Instead, I provide a novel form of perforated drum or container of such size and shape as to receive a relatively large amount of curds and whey cut from the vat in an elongated block sufficient to make several cheese bricks in a single handling operation. While contained in said drum, most of the whey is drained from the block while it is turned several times with a minimum of labor, and during such turning the block or mass is formed to the proper diameter of the final cheese bricks or wheels. The mass is then cut transversely by a multiple cutting device into a plurality of circular bricks of substantially uniform size and weight, ready for the pressing operation.

The details of my invention will now be described by reference to the accompanying drawings, in which Fig. 1 is a perspective view showing a portion of my improved apparatus arranged at one end of the cheese vat and showing a block of curds and whey preparatory to loading into a drainage drum.

Fig. 2 is a perspective view of a drum forming one of the principal features of my invention, and showing the two cooperating halves thereof separated from each other.

Fig. 3 is a view illustrating certain intermediate steps for loading a cheese block in the drum.

Fig. 4 is a detail section of a drum and showing a cylindrical cake of cheese therein after it has been turned therein and given its desired circular form preparatory to cutting the cheese into individual bricks or wheels.

Fig. 5 is a perspective view of the cutting frame forming part of my improved apparatus.

Fig. 6 is a cross section of the cutting frame shown in Fig. 5.

Fig. 7 is an end view of a drum having the cutter frame interposed between the halves thereof and showing the method of cutting the cylindrical cake into individual bricks or wheels.

Referring now to details of the apparatus illustrated in the drawings as one embodiment of my invention, the cheese may be initially treated in a relatively large cheese vat 10 of the usual form.

A plurality of elongated drums 12, preferably of substantially the same length as the width of the cheese vat are employed for receiving the blocks of curd cut into elongated blocks extending transversely of said vat. Each of said drums is split lengthwise into two similar half sections 13, 13, as clearly shown in Fig. 2. The side walls of each half are suitably perforated to permit drainage of whey therefrom, in the form shown this being provided by forming the arcuate side walls by slats 14, 14 having their adjacent margins slightly spaced apart, as is best seen in Fig. 4.

It will also be observed that the bottom portion of each drum section 13 is substantially semi-cylindrical and of the same diameter as the desired outside diameter of the circular bricks or wheels to be formed therein, but the upper meeting edges of said sections are extended a short distance tangentially of said semi-cylindrical portions. For instance, in a drum having a normal interior diameter of 8 or 9 inches, each half section may be from ½ to ¾ inch deeper than its width, so that when two of said half sections are put together, they will be from 1 to 1½ inches higher than they are wide, as clearly indicated in Fig. 4. The purpose of this construction will hereinafter more fully appear.

Suitable means are provided for holding the half sections 13, 13 in mutually registering position, as by suitably disposed lugs 15, 15 projecting from the margins of said sections. The drum sections are also provided with looped handles 16, 16 at opposite ends adjacent the abutting margins thereof, as shown, which handles are also arranged to provide interlocking engagement with the cheese cutting frame, as will hereinafter more fully appear.

In the form shown herein, the two half sections with their interlocking lugs 15, 15 and handles 16, 16, are preferably identical so that each drum section is interchangeable with each other and with similar half sections of other drums.

A loading frame 11 is preferably mounted on hinges at one end of the vat 10 to assist in transferring a block of cheese curds into the drum 12, as will presently appear.

The cutting frame is shown in Figs. 5 and 6, and comprises a rectangular open frame 20 of the same size as the open side of the drum sections 13. A plurality of knives, herein consisting of wires 22, are stretched across said frame spaced at equal distances from each other. As one means of supporting said wires, the same are mounted in a metal frame 21 including an angle iron 23 on one side, a Z iron 24 on the other side, and the two being welded to flat bars 25, 25 at opposite ends. Holes 26, 26 are spaced along the side member 23 through which the ends of the wires are anchored, while the opposite ends of said wires extend through the Z bar 24 and may be adjusted for tension by wing nuts 24ª, as shown. The entire metal frame 21 is mounted between two spacer frame members 26 and 27, which may be of wood, as shown in Figs. 5 and 6, and the latter frame members are secured together by upright pieces 28 extending upwardly along opposite ends of the frame 20, and extending beyond its upper and lower margins, as shown. These projecting ends of pieces 28, 28 are arranged to have interlocking engagement with the drum handles 16, 16 as will presently appear.

The use and operation of the apparatus above described will now be explained.

Assuming that a large number of round cheese bricks or wheels of 9 inches in diameter are to be made from a batch of curds in the cheese vate 10, said curds are partially drained and matted as usual in an even layer in the bottom of the vat. This layer is cut into a plurality of elongated blocks A, each of such predetermined size to fill a drum 12. Each of such blocks is transferred to a board 30 adjacent the loading frame, as for instance in Figs. 1 and 3, said board is supported across the top of the vat 10.

The cake A is transferred into the loading frame while the latter is in upright position, by sliding said cake therein laterally. A drum half section 13 is applied to the outer face of the loading frame so as to register therewith, the bottom edge 11ª of said frame preferably being extended as shown to support the lower edge of said drum section. With a simple movement, two men can then tip the frame and drum section downwardly as indicated in dotted lines in Fig. 3, so that the drum section then rests on an elongated stand 30. The cheese cake A then is wholly supported in the drum section, and the loading frame may then be returned to its initial upright position.

The second half section 13 of the drum may now be placed on top of the cheese cake A, which now assumes a more cylindrical shape, so that the two halves may soon be closed together, and the entire drum may be turned from time to time as required, to assist in uniform drainage of whey from all sides of the block, and also produce proper shaping of the cake into final cylindrical form, as shown in Fig. 4.

These operations of filling the drums 12 and turning the latter as described, permit the contents of an entire vat to be completed in far less time and great saving in labor over the previous methods in which each cheese cake was individually transferred to the hoop and turned several times by hand. For instance, where formerly it took three men approximately one hour to put 180 individual blocks in their hoops and remove the hoops from the cheese vat, the same amount of cheese can now be entirely removed by four men in four minutes. Furthermore, where formerly it took approximately one-half hour for two men to turn 180 hoops by hand, one man can now turn an equivalent amount of cheese contained in ten drums on the stand 30 in about three minutes. This saving in time and labor is repeated each time the cheese has to be turned.

After the cheese has drained sufficiently in the drums, and the elongated cake A has assumed a perfectly cylindrical shape of the same diameter as the arcuate bottom portion of the drum sections, the cake is ready to be cut into individual bricks or wheels.

The cutting operation consists in removing the upper half section of the drum, and the cutting frame 20 is placed on top of the lower section containing the cake. The upper half section is then placed on top of the cutting frame, the projections 28, 28 fitting in the handles 16, 16 of the two drum sections, as clearly shown in Fig. 7. By rolling movement of the drum on the stand, said drum is turned over so that the cheese passes to the opposite half of the drum and is accurately cut by the knives into a plurality of individual bricks or wheels. The cutting frame is then removed, and the bricks are transferred to hoops whereby the forming operation is completed.

Among the advantages derived from the improved apparatus and method above described are the following:

Aside from the enormous saving in time and labor over older methods as already stated, the improved process gives a much more uniform cheese as to texture than has been found possible with prior hand methods. By cutting the cake after most of the whey has been drained out, it is possible to obtain a far greater accuracy and uniformity in the final weight of the individual cheeses.

A further advantage is derived from the method which permits better drainage of whey. In the older process, when the individual cheeses are placed at once into separate hoops for draining while they still contained a relatively large quantity of whey, the exterior surface of each cake tends to become "closed" and during the latter part of the draining period the remainder of the whey can not drain out easily. With the new method the cheese drains out more readily through the elongated spaces of the drum than it does through the few holes in the usual cheese hoop. Furthermore, the final drainage of the cheese bricks is made easier after they are removed from the drum, because the cheese cake is cut through the interior portion thereof so as to open new surfaces which are much more porous than the exterior surfaces that have been in contact with boards or hoops. The cheese, therefore, drains more rapidly and with more certainty. This is of considerable importance when it is borne in mind that in cheese-making proper drainage of the cheese is of essential importance.

It will be obvious that substantially the same operation can be employed in making cheeses of varying sizes and shapes by providing drums of different shapes, but in all cases the major dimensional shape of the individual bricks may be produced by turning or rolling the drum on its longitudinal axis while the cheese block contained therein is being drained, and thus forming the cake in a compact elongated form having less cross-sectional area than the interior of the drum.

Although I have illustrated and described one particular embodiment of my invention and an illustrative series of steps that may be employed for carrying out my improved method of cheese making, it will be understood that I do not wish to be limited to the exact form of apparatus or methods shown and described, but that various changes and modifications may be made or employed without departing from the spirit and scope of my invention as defined in the appended claims.

I claim:

1. Apparatus for cheese making comprising an elongated drum having perforated walls, said drum being parted longitudinally into two sections, the lower portion of each section being semi-circular in cross section and having intermediate side wall portions between said semi-circular portions extended tangentially to the latter so as to form said drum in elongated cross section in a direction perpendicular to the parting line between said sections.

2. Apparatus for cheese making comprising an elongated drum having perforated walls, said drum being parted longitudinally into two sections, and a cutting frame adapted to be inserted in mutually registering position between said sections and having a plurality of longitudinally spaced cutting devices extending thereacross.

3. The method of forming cheese in package form, which consists in placing a block of partially drained curds sufficient to make a plurality of bricks in an elongated container having perforated side walls, turning said container while the block is draining so as to shift the block within the container and cause the sides of said block to form in substantially the final major dimensional shape of the bricks, and then cutting said block into individual bricks along planes perpendicular to the major axis of said block.

4. The method of forming cheese in package form, which consists in placing a block of partially drained curds sufficient to make a plurality of bricks in an elongated container having perforated side walls, turning said container on its longitudinal axis while the block is draining so as to reduce the transverse section of said block, and cause the sides of said block to form in substantially the final major dimensional shape of the bricks, and then cutting said block into individual bricks along planes perpendicular to the major axis of said block.

5. The method of forming cheese in package form, which consists in filling an elongated perforate container parted along its major axis, with a block of partially drained curds sufficient to make a plurality of bricks, turning said container on its major axis a plurality of times while said block is draining so as to reduce its cross-sectional area and simultaneously cause said block to form in substantially the final major dimensional shape of the bricks, and then cutting said block into individual bricks along planes perpendicular to the major axis of said block.

6. The method of forming cheese in package form, which consists in filling an elongated perforate container parted along its major axis, with a block of partially drained curds sufficient to make a plurality of bricks, turning said container on its major axis while said block is draining so as to reduce its cross-sectional area and simultaneously form it in substantially the final major dimensional shape of the bricks, and inserting a cutting frame between the sections of said container and turning said container so as to cut said blocks into individual bricks.

7. The method of forming circular cheese bricks, which consists in placing a block of partially drained curds in a one-half section of an elongated perforate cylindrical container, closing said container with another half section so as to substantially fill said cylinder, rolling said cylinder on its longitudinal axis while draining said block so as to form said cake in compact cylindrical form having less cross-sectional area than the interior of said container, and cutting said cylindrical cake into a plurality of individual bricks along planes perpendicular to the major axis of said cake.

8. The method of forming circular cheese bricks, which consists in placing a block of partially drained curds in a one-half section of an elongated perforate cylindrical container, closing said container with another half section so as to substantially fill said cylinder, rolling said cylinder on its longitudinal axis while draining said block so as to form said cake in compact cylindrical form having less cross-sectional area than the interior of said container, removing the upper half section of said container, applying a cutting frame having a plurality of spaced knives extending thereacross to the lower section, and inverting said lower container with its cake over on said cutting frame so as to cause said cake to be cut into a plurality of circular bricks.

RAYMOND MIOLLIS.